US009528586B2

United States Patent
Depraete et al.

(10) Patent No.: US 9,528,586 B2
(45) Date of Patent: Dec. 27, 2016

(54) HYDROKINETIC TORQUE COUPLING DEVICE HAVING TURBINE-PISTON LOCKUP CLUTCH AND INTERMEDIATE CLUTCH COMPONENT, AND RELATED METHODS

(71) Applicant: VALEO EMBRAYAGES, Amiens (FR)

(72) Inventors: Alexandre Depraete, Bloomfiled, MI (US); Sungchul Lee, Troy, MI (US)

(73) Assignee: Valeo Embrayages (FR)

( * ) Notice: Subject to any disclaimer, the term of this patent is extended or adjusted under 35 U.S.C. 154(b) by 131 days.

(21) Appl. No.: 14/522,333

(22) Filed: Oct. 23, 2014

(65) Prior Publication Data

US 2016/0116039 A1    Apr. 28, 2016

(51) Int. Cl.
*F16H 45/02*    (2006.01)
*F16H 45/00*    (2006.01)

(52) U.S. Cl.
CPC ......... *F16H 45/02* (2013.01); *F16H 2045/007* (2013.01); *F16H 2045/0205* (2013.01); *F16H 2045/0231* (2013.01); *F16H 2045/0278* (2013.01)

(58) Field of Classification Search
CPC .............. F16H 45/02; F16H 2045/0205; F16H 2045/0273; F16H 2045/0278
See application file for complete search history.

(56) References Cited

U.S. PATENT DOCUMENTS

| 2,130,895 | A | 9/1938 | Ness |
|---|---|---|---|
| 2,860,747 | A | 11/1958 | Kelley |
| 2,992,713 | A | 7/1961 | Stump et al. |
| 3,041,892 | A | 7/1962 | Schjolin |
| 3,252,352 | A | 5/1966 | General et al. |
| 4,041,701 | A | 8/1977 | Goto et al. |
| 5,713,442 | A | 2/1998 | Murata et al. |
| 5,813,505 | A | 9/1998 | Olsen et al. |
| 6,026,940 | A | 2/2000 | Sudau |
| 6,915,886 | B2 | 7/2005 | Dacho et al. |
| 7,191,879 | B2 | 3/2007 | Arhab et al. |

(Continued)

FOREIGN PATENT DOCUMENTS

| DE | 1550957 A1 | 7/1969 |
|---|---|---|
| DE | 2245901 A1 | 4/1974 |

(Continued)

OTHER PUBLICATIONS

U.S. Appl. No. 14/510,244, filed Oct. 9, 2014, First Named Inventor: Alexandre Depraete.
U.S. Appl. No. 14/510,267, filed Oct. 9, 2014, First Named Inventor: Alexandre Depraete.
U.S. Appl. No. 14/522,189, filed Oct. 23, 2014, First Named Inventor: Alexandre Depraete.

(Continued)

*Primary Examiner* — Jacob S Scott
(74) *Attorney, Agent, or Firm* — Berenato & White, LLC

(57) ABSTRACT

A hydrokinetic torque coupling device features an impeller including an impeller shell, a casing shell connected to the impeller shell to establish a casing with a first engagement surface, a turbine-piston including an axially movable turbine-piston shell, and an annular intermediate clutch component affixed to the turbine-piston shell and including a lockup portion. The lockup portion has a second engagement surface that is movable axially toward and away from the first engagement surface to position the hydrokinetic torque coupling device into and out of a lockup mode.

15 Claims, 9 Drawing Sheets

(56) References Cited

U.S. PATENT DOCUMENTS

| | | |
|---|---|---|
| 7,445,099 B2 | 11/2008 | Maucher et al. |
| 8,276,723 B2 | 10/2012 | Verhoog et al. |
| 2003/0168298 A1 | 9/2003 | Holler et al. |
| 2003/0168299 A1 | 9/2003 | Holler et al. |
| 2004/0011032 A1 | 1/2004 | Holler et al. |
| 2006/0086584 A1 | 4/2006 | Maucher et al. |
| 2013/0230385 A1 | 9/2013 | Lindemann et al. |
| 2014/0014454 A1 | 1/2014 | Davis |
| 2014/0014455 A1 | 1/2014 | Davis |
| 2014/0097055 A1 | 4/2014 | Lindemann et al. |
| 2014/0110207 A1 | 4/2014 | Davis |
| 2015/0152951 A1* | 6/2015 | Rentfrow ............... F16H 45/02 192/3.29 |
| 2015/0362041 A1 | 12/2015 | Lee et al. |

FOREIGN PATENT DOCUMENTS

| | | |
|---|---|---|
| DE | 10226860 A1 | 12/2003 |
| EP | 0125428 A1 | 11/1984 |
| EP | 1744074 | 1/2007 |
| FR | 668839 A | 11/1929 |
| FR | 2317556 A1 | 2/1977 |
| FR | 2428188 A1 | 1/1980 |
| FR | 2561342 A1 | 9/1985 |
| FR | 2736982 A1 | 1/1997 |
| FR | 2787854 A1 | 6/2000 |
| GB | 598811 | 2/1948 |
| JP | 58-131466 A | 8/1983 |
| KR | 101311531 B1 | 9/2013 |
| WO | WO2004018897 | 3/2004 |
| WO | 2004046574 A1 | 6/2004 |

OTHER PUBLICATIONS

U.S. Appl. No. 14/522,263, filed Oct. 23, 2014, First Named Inventor: Alexandre Depraete.
U.S. Appl. No. 14/522,302, filed Oct. 23, 2014, First Named Inventor: Alexandre Depraete.
U.S. Appl. No. 14/522,361, filed Oct. 23, 2014, First Named Inventor: David Werthman.
U.S. Appl. No. 14/522,372, filed Oct. 23, 2014, First Named Inventor: Alexandre Depraete.
U.S. Appl. No. 14/522,393, filed Oct. 23, 2014, First Named Inventor: Alexandre Depraete.
U.S. Appl. No. 14/561,961, filed Dec. 5, 2014, First Named Inventor: Alexandre Depraete.
U.S. Appl. No. 14/562,022, filed Dec. 5, 2014, First Named Inventor: Alexandre Depraete.
U.S. Appl. No. 14/562,064, filed Dec. 5, 2014, First Named Inventor: Alexandre Depraete.
U.S. Appl. No. 14/562,099, filed Dec. 5, 2014, First Named Inventor: Alexandre Depraete.
U.S. Appl. No. 14/562,136, filed Dec. 5, 2014, First Named Inventor: Alexandre Depraete.
U.S. Appl. No. 14/562,216, filed Dec. 5, 2014, First Named Inventor: Sungchul Lee.
U.S. Appl. No. 14/562,253, filed Dec. 5, 2014, First Named Inventor: Alexandre Depraete.
U.S. Appl. No. 14/562,286, filed Dec. 5, 2014, First Named Inventor: Alexandre Depraete.
U.S. Appl. No. 14/687,602, filed Apr. 15, 2015, First Named Inventor: Alexandre Depraete.
Lindemann et al., "iTC—Innovative Solutions for Torque Converters Pave the Way into the Future", Torque Converter 20, pp. 280-301.

* cited by examiner

HYDROKINETIC TORQUE COUPLING DEVICE HAVING TURBINE-PISTON LOCKUP CLUTCH AND INTERMEDIATE CLUTCH COMPONENT, AND RELATED METHODS

BACKGROUND OF THE INVENTION

1. Field of the Invention

The present invention generally relates to hydrokinetic torque coupling devices, and more particularly to a hydrokinetic torque coupling device including a turbine-piston lockup clutch and an intermediate clutch component for mechanically coupling driving and driven shafts.

2. Description of the Related Art

Generally, vehicles with automatic transmissions are equipped with a hydrokinetic torque coupling device for fluidly coupling the driving shaft of an engine to a driven shaft of a transmission. Lockup clutches are known for mechanically coupling the driving and driven shafts under certain operating conditions. Lockup clutches and their operation are described in, for example, U.S. Pat. Nos. 8,276,723 and 7,191,879.

While hydrokinetic torque coupling devices with lockup clutches have proven to be acceptable for vehicular driveline applications and conditions, improvements that may enhance their performance and cost are possible.

As taught hereinbelow, such improvements may derive from, for example, reducing the spatial requirements of components of the hydrokinetic torque coupling device and/or consolidating functions of two or more components into a single component.

BRIEF SUMMARY OF THE INVENTION

According to a first aspect of the invention, there is provided a hydrokinetic torque coupling device for coupling together a driving shaft and a driven shaft. The hydrokinetic torque coupling device of this first aspect includes at least an impeller with an impeller shell, a casing shell connected to the impeller shell to collectively establish a casing with a first engagement surface, a turbine-piston including an axially movable turbine-piston shell, and an annular intermediate clutch component affixed to the turbine-piston shell and including a lockup portion. The lockup portion has a second engagement surface that is movable axially toward and away from the first engagement surface to position the hydrokinetic torque coupling device into and out of a lockup mode in which the annular intermediate clutch component with the turbine-piston shell affixed thereto is mechanically locked with so as to be non-rotatable relative to the casing.

A second aspect of the invention provides a method of assembling a hydrokinetic torque coupling device. A torque converter coaxially aligned with and rotatable about a rotational axis is provided. The torque converter includes at least an impeller with an impeller shell, and a turbine-piston with a turbine-piston shell. The torque converter is operatively connected with a casing shell and an intermediate clutch component including at least a lockup portion to provide a structure in which (i) the lockup portion is affixed to the turbine-piston shell, (ii) a casing including at least the casing shell and the impeller shell and having a first engagement surface is provided, and (iii) the lockup portion has a second engagement surface that is movable axially toward and away from the first engagement surface of the casing to position the hydrokinetic torque coupling device into and out of a lockup mode in which the annular intermediate clutch component with the turbine-piston shell affixed thereto is mechanically locked with so as to be non-rotatable relative to the casing.

A third aspect of the invention provides a method of coupling a driving shaft and a driven shaft together with a hydrokinetic torque coupling device. The hydrokinetic torque coupling device includes an impeller coaxially aligned with a rotational axis and including an impeller shell, a casing shell rotatable about the rotational axis and connected to the impeller shell to establish a casing having a first engagement surface, a turbine-piston coaxially aligned with and hydrodynamically drivable by the impeller and including an axially movable turbine-piston shell, an annular intermediate clutch component affixed to the turbine-piston shell and including a lockup portion, and a damper assembly configured to interconnect the annular intermediate clutch component and an output hub. The lockup portion of the intermediate clutch component has a second engagement surface that is movable axially toward and away from the first engagement surface of the casing to position the hydrokinetic torque coupling device into and out of a lockup mode in which the annular intermediate clutch component with the turbine piston shell affixed thereto is mechanically locked with so as to be non-rotatable relative to the casing. The method further involves operatively connecting the driving shaft and the driven shaft to input and output parts of the hydrokinetic torque coupling device, and controlling axial movement of the turbine-piston to move the hydrokinetic torque coupling device into and out of the lockup mode.

Other aspects of the invention, including apparatus, devices, systems, coupling devices, converters, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

Figure 1:
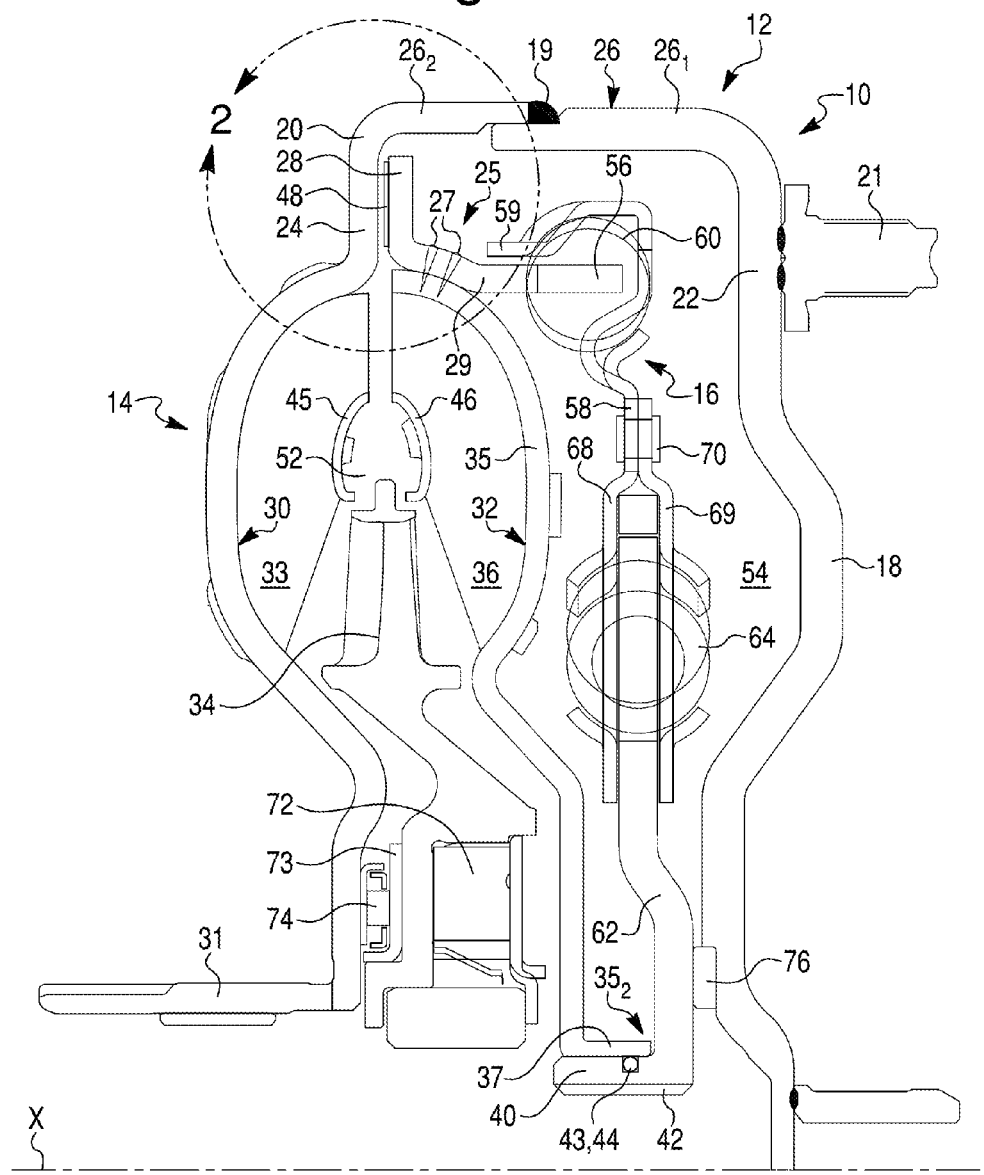
FIG. 1 is a fragmented half-view in axial section of a hydrokinetic torque coupling device equipped with a turbine-piston in accordance with a first exemplary embodiment of the present invention.

DETAILED DESCRIPTION OF EXEMPLARY EMBODIMENT(S) AND EMBODIED METHOD(S) OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper," "lower," "right," "left," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one."

A first exemplary embodiment of a hydrokinetic torque coupling device is generally represented in the accompanying drawings by reference numeral 10, as best shown in the fragmentary sectional view in FIG. 1. The hydrokinetic torque coupling device 10 is operable to fluidly couple a driving shaft and a driven shaft of a motor vehicle, such as an automobile. In the typical case, the driving shaft is an output shaft of an internal combustion engine (not shown) of the motor vehicle and the driven shaft is connected to an automatic transmission of the motor vehicle.

The hydrokinetic torque coupling device 10 includes a sealed casing 12 filled with a fluid, such as oil or transmission fluid. The sealed casing 12, a hydrodynamic torque converter 14 and a torsional vibration damper (also referred to herein as a damper assembly) 16 are all rotatable about a rotational axis X. The drawings discussed herein show half-views, that is, the portion or fragment of the hydrokinetic torque coupling device 10 above rotational axis X. Generally, the device 10 is symmetrical about the rotational axis X. Herein, the axial and radial orientations are considered with respect to the rotational axis X of the torque coupling device 10. The relative terms such as "axially," "radially," and "circumferentially" are with respect to orientations parallel to, perpendicular to, and circularly around the rotational axis X, respectively.

The sealed casing 12 according to the first exemplary embodiment as illustrated in FIG. 1 includes a first casing shell 18 and a second casing shell 20 non-movably (i.e., fixedly) interconnected sealingly together, such as by welding at weld 19 at their outer peripheries. The first shell 18 is non-movably (i.e., fixedly) interconnected to the driving shaft, more typically a flywheel (not shown) that is fixed to so as to be non-rotatable relative to the driving shaft, so that the casing 12 turns at the same speed that the engine operates for transmitting torque. Specifically, in the illustrated embodiment of FIG. 1 the casing 12 is rotatably driven by the internal combustion engine and is non-rotatably coupled to the flywheel thereof with studs 21, shown in FIG. 1. Each of the first and second casing shells 18, 20 may be made, for example, integrally by press-forming one-piece metal sheets.

The first casing shell 18 includes a first sidewall portion 22 extending substantially radially relative to the direction from the rotational axis X (i.e., in a plane that is generally transverse to the rotational axis X) and a cylindrical first outer wall portion $26_1$ extending substantially axially from the first sidewall portion 22 toward the second casing shell 20. Similarly, the second casing shell 20 includes a second sidewall portion 24 extending substantially radially relative to the direction from the rotational axis X and a cylindrical second outer wall portion $26_2$ extending substantially axially from the second sidewall portion 24 toward the first casing shell 18. The second sidewall portion 24 includes a first engagement surface $24_1$, best shown in FIG. 2. The first and second outer wall portions $26_1$, $26_2$ collectively establish an annular outer wall 26 substantially parallel with the rotation axis X. The weld 19 fixedly secures the outer wall portions $26_1$ and $26_2$ together. Although not shown, the casing 12 may include additional components, such as an annular cylindrical shell welded at opposite ends to and interconnecting the first and second outer wall portions $26_1$, $26_2$ together.

The torque converter 14 includes an impeller (sometimes referred to as the pump or impeller wheel) 30, a turbine-piston 32, and a stator (sometimes referred to as the reactor) 34 interposed axially between the impeller 30 and the turbine-piston 32. The impeller 30, the turbine-piston 32, and the stator 34 are coaxially aligned with one another on the rotational axis X. The impeller 30, the turbine-piston 32, and the stator 34 collectively form a torus. The impeller 30 and the turbine-piston 32 may be fluidly (or hydrodynamically) coupled to one another as known in the art.

The second casing shell 20 of the casing 12 also forms and serves as the impeller shell of the impeller 30. Accordingly, the impeller shell 20 sometimes is referred to as part of the casing 12. The impeller 30 further includes a core ring 45, and a plurality of impeller blades 33 fixedly attached, such as by brazing, to the impeller shell 20 and the core ring 45.

The impeller 30, including its shell 20, the core ring 45, and the blades 33, is fixedly secured to so as to be non-rotatable relative to the casing 12 and hence to the drive shaft (or flywheel) of the engine to rotate at the same speed as the engine output. The impeller 30 also includes an impeller hub 31 fixedly secured to the impeller shell 20. The impeller hub 31 is arranged for engagement with a hydraulic pump of the transmission.

The torque coupling device 10 further includes an output hub 40 that is rotatable about the rotational axis X. The output hub 40 is operatively coupled to and coaxial with the driven shaft. For example, the output hub 40 may be provided with internal splines 42 for coupling the output hub 40 non-rotatably relative to the driven shaft, such as a transmission input shaft, provided with complementary external splines or grooves. Alternatively, a weld or other connection may be used to fix the output hub 40 to the driven shaft. A radially outer surface of the output hub 40 includes an annular slot 43 for receiving a sealing member, such as an O-ring 44. Although not shown, a sealing member may be mounted to a radially inner surface of the output hub 40 to create a seal at its interface with the transmission input shaft.

The turbine-piston 32 is a consolidation or incorporation of a turbine with a lockup clutch piston. The turbine component of the turbine-piston 32 includes a turbine-piston shell 35, a core ring 46, and a plurality of turbine blades 36 fixedly attached, such as by brazing, to the turbine-piston shell 35 and the core ring 46. The spinning of the impeller 30 causes transmission fluid in the torus to spin the turbine blades 36, and hence the turbine-piston shell 35 when in hydrodynamic transmission mode. The impeller shell 20 and the turbine-piston shell 35 collectively define a substantially toroidal inner chamber (or torus chamber) 52 therebetween.

Extending axially at a radially inner peripheral end $35_2$ of the turbine-piston shell 35 is a substantially cylindrical flange 37 that is proximate to the rotational axis. The substantially cylindrical flange 37 of the turbine-piston 32 is rotatable relative to the output hub 40. The sealing member (e.g., O-ring) 44 creates a seal at the interface of the substantially cylindrical flange 37 and the output hub 40. As discussed in further detail below, the turbine-piston 32 is axially movable relative to the output hub 40 along this interface.

An annular intermediate clutch component 25 is affixed to the turbine-piston shell 35, such as by an annular weld and/or fasteners 27. As shown in FIG. 1, for example, the annular intermediate clutch component 25 is located radially outside of the turbine blades 36 near the end of the turbine-piston shell 35 distal to the rotational axis X. The annular intermediate clutch component 25 includes a lockup portion 28 and a drive portion 29. Although the lockup portion 28 and the drive portion 29 are embodied as integral with one another, e.g., made of a single or unitary component, the portions 28, 29 may be separate components connected together.

Figure 2:
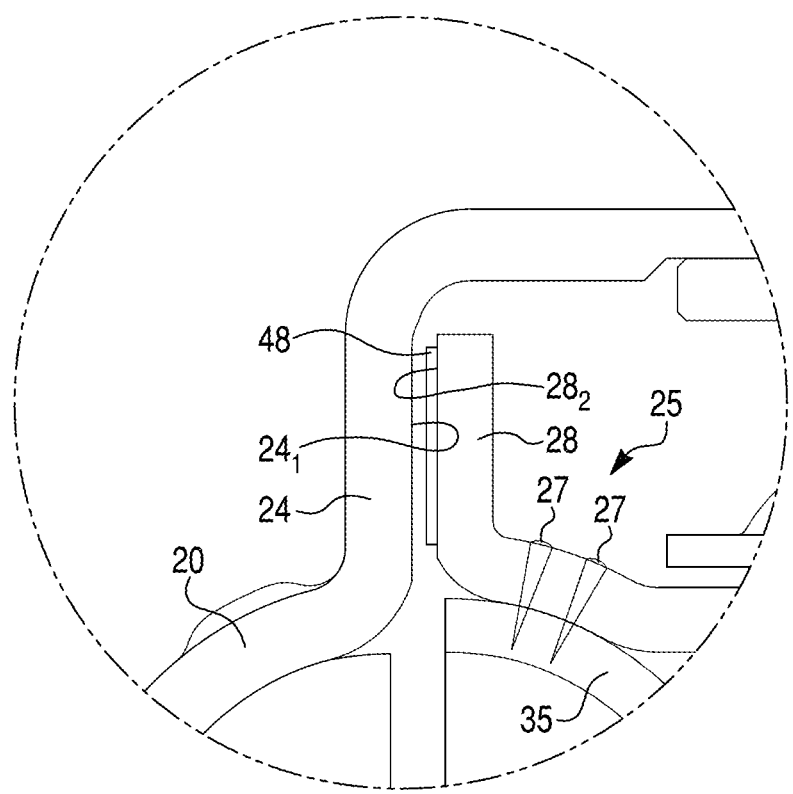
FIG. 2 is an enlarged fragmentary view of circle 2 of FIG. 1 out of lockup mode, that is, in hydrodynamic transmission mode.

As best shown in FIG. 2, the lockup portion 28 of the annular intermediate clutch component 25 has a second engagement surface $28_2$. The first and second engagement surfaces $24_1$ and $28_2$ are parallel to and face one another, and extend radially at a 90 degree angle relative to the rotational axis X. The second engagement surface $28_2$ faces and, as explained below, is movable axially toward and away from the first engagement surface $24_1$ of the casing 12 to position the annular intermediate clutch component 25 respectively into and out of a lockup mode.

In accordance with the first exemplary embodiment, second engagement surface $28_2$ is provided with a friction ring (or friction lining) 48, best shown in FIG. 2. The friction ring 48 may be secured to the second engagement surface $28_2$, for example, by adhesive bonding and/or with fasteners. The friction ring 48 is made of a friction material for improved frictional performance. Alternatively, a friction ring (or friction lining) may be secured to the first engagement surface $24_1$. According to still another embodiment, a first friction ring or liner is secured to the first engagement surface $24_1$ of the casing 12 and a second friction ring or liner is secured to the second (engagement) surface $28_2$ of the lockup portion 28. It is within the scope of the invention to omit one or both of the friction rings.

The stator 34 is positioned between the impeller 30 and turbine-piston 32 to redirect fluid from the turbine-piston 32 back to the impeller 30 in an efficient manner. The stator 34 is typically mounted on a one-way clutch 72 to prevent the stator 34 from counter-rotation. A thrust bearing 74 is interposed between a side wall bearing ring 73 of the stator 34 and the impeller shell 20 of the casing 12.

In the lockup mode, the first and second engagement surfaces $24_1$ and $28_2$ (or friction ring(s) 48 secured thereto) are pressed together such that the lockup portion 28 of the annular intermediate clutch component 25 is frictionally non-rotatably coupled to the casing 12. Because the annular intermediate clutch component 25 is non-rotatably fixed to the turbine-piston shell 35, the turbine-piston 32 is mechanically locked to the casing 12 in the lockup mode. When not in the lockup mode, the first and second engagement surfaces $24_1$ and $28_2$ are spaced from one another, such that the lockup portion 28 of the annular intermediate clutch component 25 is not frictionally non-rotatably coupled to the casing 12. In the non-lockup mode, normal operation of the torque converter 14 selectively fluidly (hydrodynamically) couples and decouples the turbine-piston 32 to and from the impeller 30.

As mentioned above, the intermediate clutch component 25 also includes the drive portion 29. In the first embodiment, the drive portion 29 is shown extending axially towards the damper assembly 16. The drive portion 29 axially overlaps and engages the damper assembly 16, irrespective of whether the annular intermediate clutch component 25 is in and out of lockup mode. In both modes, the drive portion 29 is configured to rotationally drive the damper assembly 16 and the output hub 40.

The damper assembly 16 is housed in the casing 12 axially between the turbine-piston 32 and the first casing shell 18, as shown in FIG. 1. The drive portion 29 of the intermediate clutch component 25 serves as the input for the damper assembly 16. The distal end portion of the drive portion 29 includes drive tabs 56. The damper assembly 16 further includes a plurality of first (or radially outer) circumferential elastic damping members 60, an intermediate member 58 drivenly coupled to the drive tabs 56 of the drive portion 29 through the first circumferential damping members 60, a plurality of second (or radially inner) circumferential elastic damping members 64, and a driven (or output) member 62 drivenly coupled to the intermediate member 58 through the second circumferential damping members 64. The first circumferential damping members 60 are radially outward from the second circumferential damping members 64. According to the exemplary embodiment of FIG. 1 and other embodiments discussed herein, the first and second damping members 60, 64 are configured as helical (or coil) springs having a principal axis oriented substantially circumferentially. Other elastic members may be selected to replace or supplement the springs.

The intermediate clutch component 25 is fixedly connected to the turbine-piston shell 35 of the turbine-piston 32, such as by weld or fasteners 27. The drive tabs 56 at the output side of the drive portion 29 extend axially in the direction away from the impeller shell 20 and engage the damper assembly 16. The drive tabs 56 are circumferentially equidistantly spaced from one another to engage circumferential ends of the first damping members 60.

The intermediate member 58 has a plurality of driven tabs 59 extending axially in an opposite direction as the drive tabs 56 of the drive portion 29. The driven tabs 59 of the intermediate member 58 are circumferentially equidistantly spaced from one another, and engage the opposite circumferential ends of the first damping members 60 than the drive tabs 56. The intermediate member 58 of the damper assembly 16 is rotatable relative to the drive portion 29 due to elasticity of the first damping members 60, which absorb torsional vibration.

Additionally, the drive tabs 56 of the intermediate clutch component 25 are axially movable relative to the driven tabs 59 of the intermediate member 58. This relative axial movement may become necessary during axial movement of the turbine-piston shell 35.

When the turbine-piston shell 35 shifts axially due to a lockup event, which is discussed further below, the drive tabs 56 move axially relative to the driven tabs 59. Thus, the drive portion 29 of the intermediate clutch component 25 is both axially and circumferentially moveable relative to the intermediate member 58, and generally to the damping assembly 16.

The radially inner end portion of the intermediate member 58 forms or is connected to a first disk part 68 on a first side of the second damping members 64. The first disk part 68 is non-moveably secured to a second disk part 69 on the opposite side of the second damping members 64, such as by rivets 70 or welding. The first and second disk parts 68, 69 establish an input part to the second damping members 64.

The driven member 62 establishes an output part of the second damping members 64. The driven member 62 has windows in which the second damping members 64 are set. The disk parts 68, 69 engage first ends of the second damping members 64, and the driven member 62 engages second ends of the second damping members 64. The disk parts 68, 69 of the intermediate member 58 are thus rotatable relative to the driven member 62, with the second damping members 64 absorbing torsional vibration due to their elasticity.

As shown in FIG. 1, the output hub 40 and driven member 62 are integral with one another. Alternatively, the driven member 62 may be non-rotatably connected to the output hub 40. The non-rotatable connection between the driven member 62 and the output hub 40 may be formed by splines or welding. A thrust bearing 76 is positioned between the drive member 62 and the first casing shell 18.

As discussed above, the turbine-piston 32 is axially movable toward and away from the impeller shell 20 between a lockup position and a non-lockup (open) position. Axial movement of the turbine-piston 32 is accomplished by changing the pressure differential between the opposite sides of the turbine-piston shell 35. Referring to FIG. 1, a torus chamber 52 is to the left side of the turbine-piston shell 35, and a damper chamber 54 is to the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston shell 35 with the intermediate clutch component 25 affixed thereto axially in the direction of torque transmission, i.e., towards the output side of the casing 12, that is right to left in FIG. 1, into lockup mode. On the other hand, a pressure decrease in the damper chamber 54 relative to the torus chamber 52 (or stated differently a pressure increase in the torus chamber 52 relative to the damper chamber 54) shifts the turbine-piston shell 35 and the intermediate clutch component 25 affixed thereto axially against the direction of torque transmission, i.e., towards the input side of the casing, that is left to right in FIG. 1, out of lockup mode. Pressure changes are created by control of the fluid, e.g., hydraulic fluid or oil, in the chambers 52 and 54.

In the lockup mode, the turbine-piston shell 35 is displaced axially towards the impeller 30 until the frictional ring 48 of the second engagement surface $28_1$ of the intermediate clutch component 25 (which moves axially with the turbine-piston shell 35) abuts against and is non-rotatably frictionally coupled to the first engagement surface $24_1$. In the lockup mode, torque is transferred from the engine to the casing 12, then by way of the frictional engagement between surfaces $24_1$ and $28_2$ (or the frictional lining 48 thereof) to the intermediate clutch component 25, then serially to the damping assembly 16 and the output hub 40. Thereby, the lockup portion 28 and the casing 12 together create a lockup clutch that bypasses the hydrodynamic fluid coupling of the torque converter 14 and mechanically couples the driving and driven shafts. Notably, the friction ring 48 secured to the second engagement surface 392 may have a plurality of circumferentially spaced grooves (not shown) extending generally radially so as to fluidly connect the torus chamber 52 and the damper chamber 54 with one another in the lockup mode for cooling friction surfaces of the lockup clutch 50 by the working fluid.

In the non-lockup position, the turbine-piston 32 is displaced axially away from the impeller 30, axially moving the intermediate clutch component 25 affixed thereto until the second engagement surface $28_2$ (or the frictional lining 48 thereof) is spaced from and no longer non-rotatably frictionally coupled to the first engagement surface $24_1$. Thus, torque transferred from the engine to the casing 12 in a hydrodynamic transmission mode does not bypass the torque converter 14 through the lockup clutch. Notably, in the non-lockup mode an open fluid passage is established between the first engagement surface $24_1$ of the casing 12 and the second engagement surface $28_2$ of the lockup portion 28. Hydraulic fluid is free to flow between the torus chamber 52 and the damper chamber 54 through the passage.

Torque received by the locked up intermediate clutch component 25 is transmitted through the torsional vibration damper 16 to the output hub 40, which is connected to the driven shaft, such as by splines 42. As the turbine-piston 32 and the intermediate clutch component 25 move axially into lockup position as described above, the drive tabs 56 of the drive portion 29 are axially displaced relative to the driven tabs 59 of the intermediate member 58. The relative axial movement between the drive tabs 56 and the driven tabs 59 allows the intermediate member 58, the driven member 62, and the damping members 60, 64 to remain fixed axially on the output hub 40 while the turbine-piston shell 35 and the intermediate clutch component 25 move in the axial direction into and out of lockup mode.

In operation, the lockup clutch is generally activated after the hydrodynamic coupling of the driving and driven shafts, typically at relatively constant speeds, in order to avoid the loss of efficiency caused in particular by slip phenomena between the turbine-piston 32 and the impeller 30. Because of the axial pressures acting on the turbine-piston 32 for movement between its lockup and non-lockup positions, the turbine-piston shell 35 may be made somewhat thicker than typical turbine shells that do not form or function as the lockup piston. Although not shown, a biasing member, such as a spring (e.g., a washer spring), may be included in the hydrokinetic torque coupling device 10 to axially urge the turbine-piston 32 into or out of lockup mode.

The turbine-piston 32 both forms the shell component of the turbine and the piston component of the lockup clutch, as described above. By consolidating two components that are normally separate from one another into a single component, space is saved in the torque hydrokinetic torque coupling device 10. This space-saving structure provides several design options. For example, the hydrokinetic torque coupling device 10 can be made smaller and lighter. Alternatively, the free space within the casing 12 can be used to add additional components, such as damping components. Additionally, and as discussed in greater detail below, the intermediate clutch component 25 simplifies assembly of the hydrokinetic torque coupling device 10.

Various modifications, changes, and alterations may be practiced with the above-described embodiment, including but not limited to the additional embodiments shown in FIGS. 3-7. In the interest of brevity, reference characters that are discussed above in connection with FIGS. 1 and 2 are not further elaborated upon below in FIGS. 3-7, except to the extent necessary or useful to explain the additional embodiments of FIGS. 3-7. Modified components and parts are indicated by the addition of a hundred digit for the second embodiment, two hundreds digit for the third embodiment, etc., to the reference numeral. For example, the damper assembly 16 of FIGS. 1 and 2 is modified in FIG. 3 and thus is designated by reference numeral 116.

Figure 3:
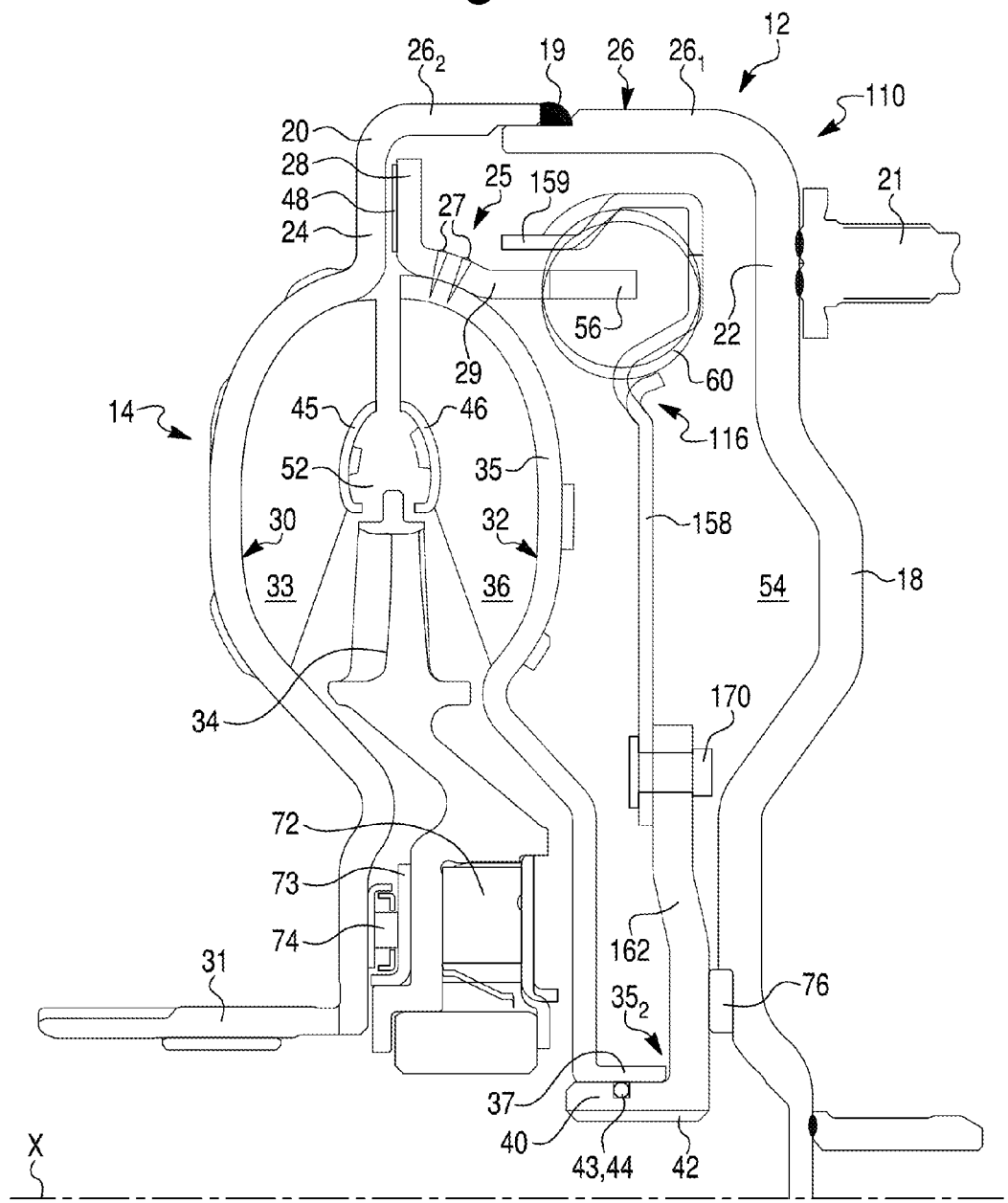
FIG. 3 is a fragmented half-view in axial section of a hydrokinetic torque coupling device equipped with a turbine-piston in accordance with a second exemplary embodiment of the present invention.

In a hydrokinetic torque coupling device 110 of a second embodiment illustrated in FIG. 3, damper assembly 116 having one set of circumferential elastic damping members 60 replaces the damper assembly 16 of FIGS. 1 and 2 (that had two sets of damper members 60 and 64). Thus, damping members 64 of FIGS. 1 and 2 are omitted from the embodiment of FIG. 3. Notably, the enlarged view of FIG. 2 is shared by the embodiment of FIG. 3, i.e., the first and second engagement surfaces $24_1$ and $28_2$ and frictional ring 48 are the same. The torsional vibration damper 116 includes an intermediate member 158 rotatable relative to (as the result of the damping members 60) and drivenly coupled to the drive tabs 56 of the drive portion 29. The intermediate member 158 is fixedly connected by rivets 170 to a driven (or output) member 162, which is thereby drivenly coupled to and non-rotatable relative to the intermediate member 158. The driven member 162 is connected to and drives the output hub 40. As mentioned above, the splines 42 non-rotatably connect the output hub 40 to the driven shaft of the transmission.

Still referring to FIG. 3, the intermediate member 158 is rotatable relative to the drive portion 29 due to elasticity of the damping members 60. The intermediate member 158 has a plurality of driven tabs 159 extending axially in an opposite direction as the drive tabs 56 of the drive portion 29. The driven tabs 59 of the intermediate member 158 engage the opposite circumferential ends of the first damping members 60 than the drive tabs 56. The driven tabs 159 are circumferentially equidistantly spaced from one another. The drive tabs 56 of the intermediate clutch component 25 are axially movable relative to the driven tabs 159 of the intermediate member 158, such as may become necessary during axial movement of the turbine-piston shell 35. When the turbine-piston shell 35 shifts axially due to a lockup event, the drive tabs 56 move axially relative to the driven tabs 159. Thus, the drive portion 29 of the intermediate clutch component 25 is both axially and circumferentially moveable relative to the intermediate member 158 in a manner similar to that described above in connection with the embodiment of FIG. 1.

Figure 4:
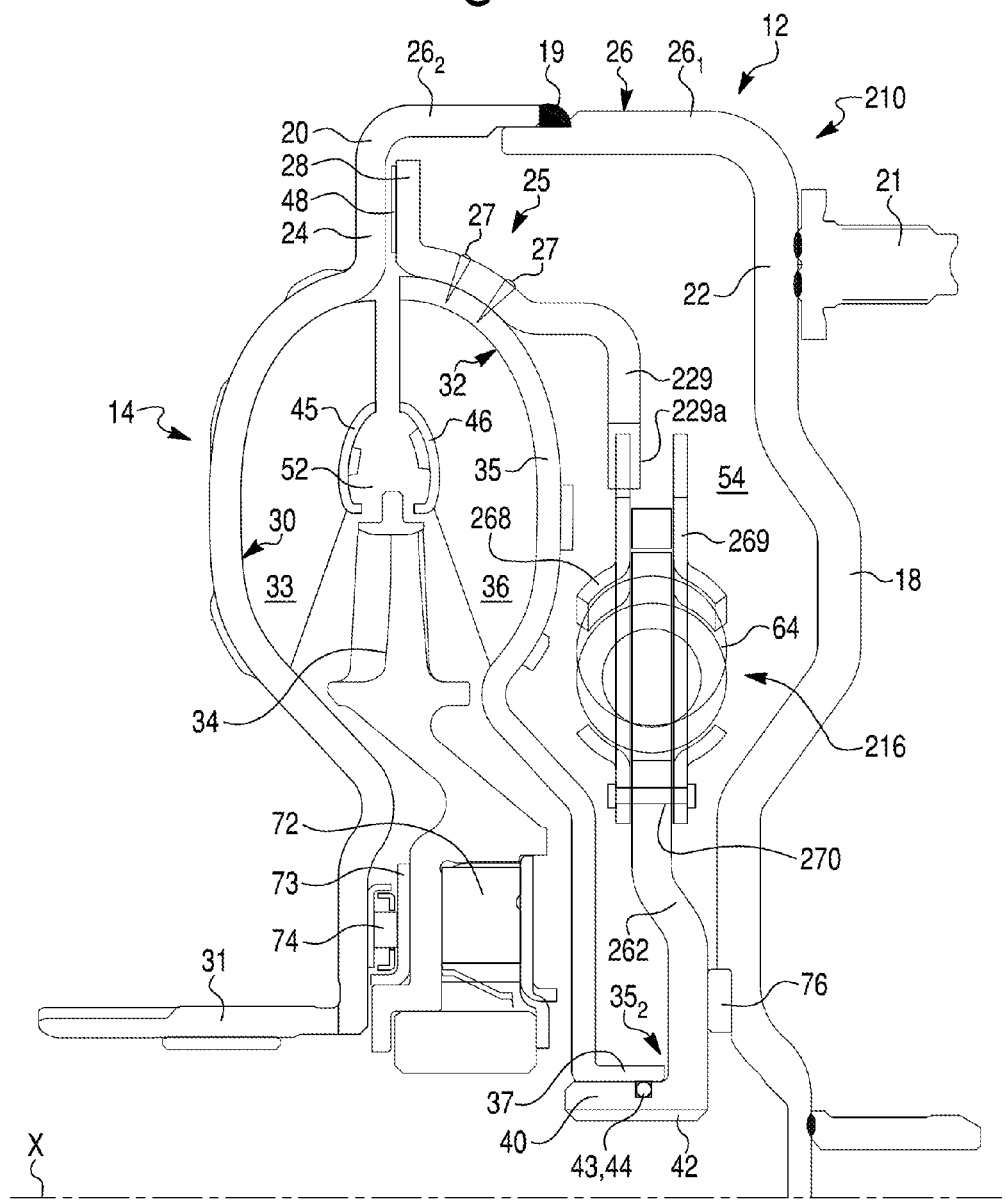
FIG. 4 is a fragmented half-view in axial section of a hydrokinetic torque coupling device equipped with a turbine-piston in accordance with a third exemplary embodiment of the present invention.

In a hydrokinetic torque coupling device 210 of a third embodiment illustrated in FIG. 4, damper assembly 216 having one set of circumferential elastic damping members 64 replaces the damper assembly 16 of FIGS. 1 and 2 (that had two sets of damper members 60 and 64). That is, the radially outer set of damper members 60 has been omitted from the embodiment of FIG. 4. Notably, the enlarged view of FIG. 2 is shared by the embodiment of FIG. 4.

The intermediate clutch component 25 includes a drive portion 229 that is fixed non-rotatably to a first disk part 268 of the torsional vibration damper 216. The first disk part 268 on the first side of the damping members 64 is non-rotatably attached by rivets 270 to a second input part 269 on the opposite side of the torsional vibration dampers 216. The first and second disk parts 268, 269 establish an input part to the damping members 64, which sit in windows of a driven member 262. The input disk parts 268, 269 are rotatable relative to the driven member 262, with the second damping members 64 absorbing torsional vibration due to their elasticity. Splines 229a allow relative axial movement between the drive portion 229 and the damper assembly 216.

Figure 5:
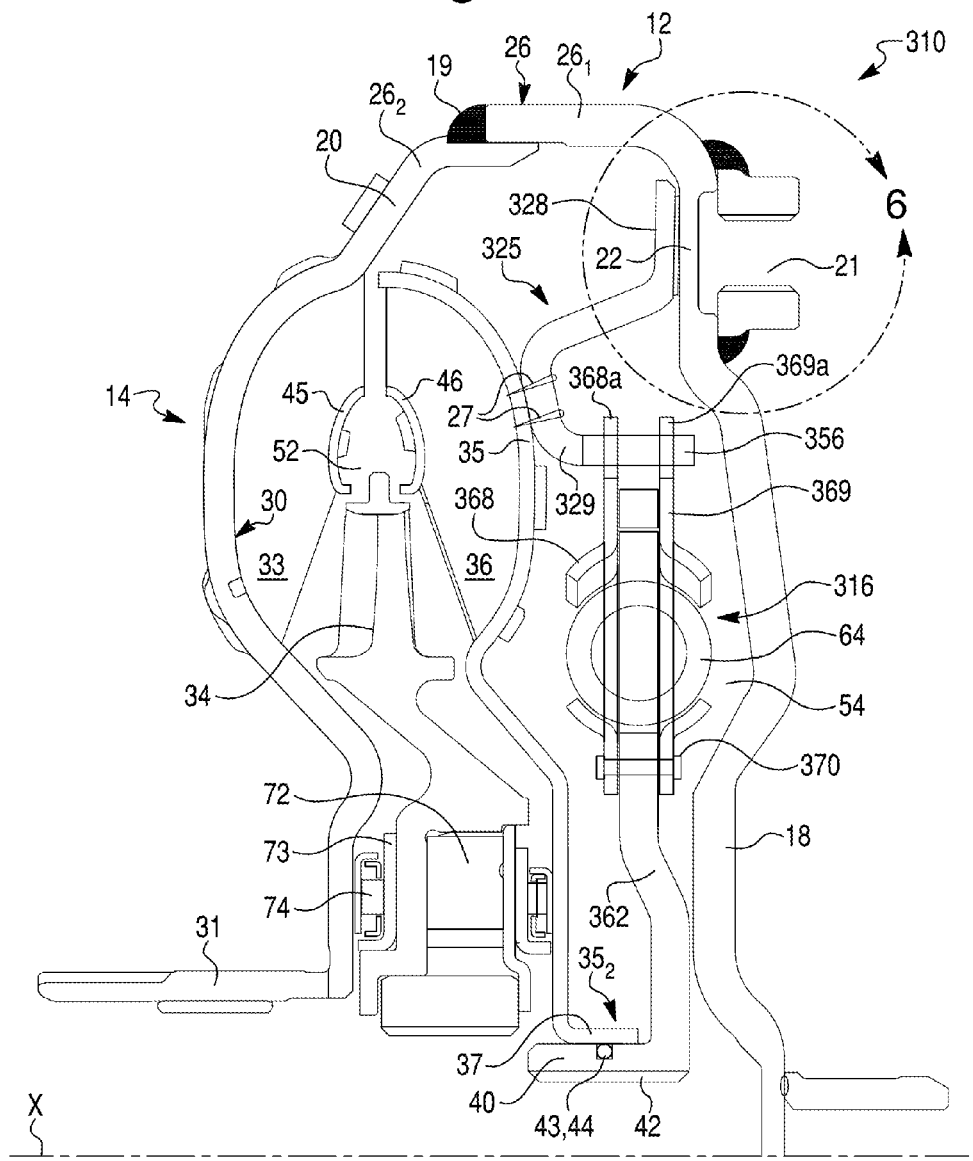
FIG. 5 is a fragmented half-view in axial section of a hydrokinetic torque coupling device equipped with a turbine-piston in accordance with a fourth exemplary embodiment of the present invention.
Figure 6:
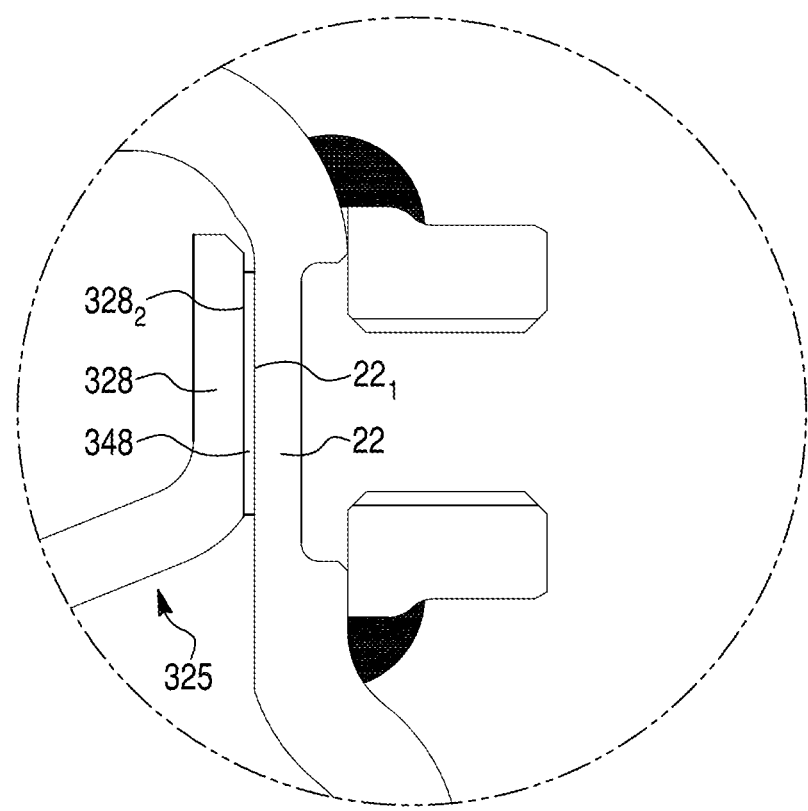
FIG. 6 is an enlarged fragmentary view of circle 6 of FIG. 5.

Turning to FIGS. 5 and 6, a hydrokinetic torque coupling device 310 of a fourth embodiment is shown. The intermediate clutch component 325 is affixed to the turbine-piston shell 35 by welds or fasteners 27, but at a radially inward position compared to the embodiments of FIGS. 1-4. That is, the welds or fasteners 27 radially overlap the turbine blades 36. The intermediate clutch component 325 includes a lockup portion 328 and a drive portion 329. Although the lockup portion 328 and the drive portion 329 are embodied as integral with one another, e.g., made of a single or unitary component, the portions 328, 329 may be separate components connected together.

As best shown in FIG. 6, which shows the lockup clutch in a lockup mode, the lockup portion 328 of the annular intermediate clutch component 325 has a second engagement surface $328_2$ with a friction lining 348. The second engagement surface $328_2$ is parallel to a first engagement surface $22_1$ of the first sidewall portion 22 on the input side of the hydrokinetic torque coupling device 310. The first engagement surface $22_1$ and the second engagement surface $328_2$ are parallel to and face one another, and extend radially at a 90 degree angle relative to the rotational axis X. The second engagement surface $328_2$ is movable axially toward and away from the first engagement surface $22_1$ of the casing 12 to position the annular intermediate clutch component 325 (and hence the hydrokinetic torque coupling device 310) respectively into and out of a lockup mode.

In accordance with this fourth exemplary embodiment, the second engagement surface $328_2$ is provided with the friction ring (or friction lining) 348, best shown in FIG. 6. The friction ring 348 may be secured to the second engagement surface $328_2$, for example, by adhesive bonding and/or with fasteners. The friction ring 348 is made of a friction material for improved frictional performance. Alternatively, a friction ring (or friction lining) may be secured to the first engagement surface $22_1$. According to still another embodiment, a first friction ring or liner is secured to the first engagement surface $22_1$ of the casing 12 and a second friction ring or liner is secured to the second (engagement)

surface $328_2$ of the lockup portion 328. It is within the scope of the invention to omit one or both of the friction rings.

In the lockup mode, the first and second engagement surfaces $22_1$ and $328_2$ (or the friction ring(s) 348 secured thereto) are pressed together such that the lockup portion 328 of the annular intermediate clutch component 325 is frictionally non-rotatably coupled to the casing 12. Because the annular intermediate clutch component 325 is non-rotatably fixed to the turbine-piston shell 35, the turbine-piston 32 is mechanically locked to the casing 12 in lockup mode. When not in lockup mode, the first and second engagement surfaces $22_1$ and $328_2$ are spaced from one another, such that the lockup portion 328 of the annular intermediate clutch component 325 is not frictionally non-rotatably coupled to the casing 12. Consequently, the turbine-piston 32 fluidly/hydrodynamically couples to the impeller 30 through normal operation of the torque converter 14 in the non-lockup mode.

The drive portion 329 is shown extending axially towards and engaging the damper assembly 316. The drive portion 329 axially overlaps and engages the damper assembly 316 irrespective of whether the device 310 is in or out of lockup mode. In both modes, i.e., lockup and non-lockup, the drive portion 329 is configured to rotationally drive the damper assembly 316 and the output hub 40.

The damper assembly 316 is housed in the casing 12 axially between the turbine-piston 32 and the first casing shell 18, as shown in FIG. 5. The drive portion 329 of the intermediate clutch component 325 serves as the input for the damper assembly 316. The distal end portion of the drive portion 329 includes drive tabs 356 that engage driven tabs 368a, 369a of first and second disk parts 368, 369. The drive tabs 356 are non-rotatable yet axially moveable relative to the driven tabs 368a, 369a. This relative axial movement between the drive tabs 356 and the driven tabs 368a, 369a may become necessary during axial movement of the turbine-piston shell 35, which axially moves the intermediate clutch component 325. The first and second disk parts 368, 369, the rivets 370, the damping members 64, and the output member 362 operate in a similar manner as described above in connection with previous embodiments, especially the third embodiment shown in FIG. 4.

The turbine-piston 32 is axially movable toward and away from the impeller shell 18 between a lockup position and an open (non-lockup) position. Movement of the turbine-piston 32 is accomplished by changing the pressure differential between the opposite sides of the turbine-piston shell 35. Referring to FIG. 5, a torus chamber 52 is on the left side of the turbine-piston shell 35, and a damper chamber 54 is on the other (right) side of the turbine-piston shell 35. A pressure increase in the damper chamber 54 relative to the torus chamber 52 (or stated differently a pressure decrease in the torus chamber 52 relative to the damper chamber 54) shifts the turbine-piston shell 35 axially in the direction of torque transmission, i.e., towards the output side of the casing 12, that is right to left in FIG. 1, out of lockup mode. On the other hand, a pressure decrease in the damper chamber 54 relative to the torus chamber 52 (or stated differently a pressure increase in the torus chamber 52 relative to the damper chamber 54) shifts the turbine-piston shell 35 and the intermediate clutch component 25 affixed thereto axially against the direction of torque transmission, i.e., towards the input side of the casing 12, that is left to right in FIG. 1, into lockup mode.

In the lockup mode, the turbine-piston 32 is displaced axially away from the impeller 30 until the frictional ring 348 of the second engagement surface $328_2$ of the intermediate clutch component 325 (which moves axially with the turbine-piston shell 35) abuts against and is non-rotatably frictionally coupled to the first engagement surface $22_1$. In the lockup mode, torque is transferred from the engine to the casing 12, then by way of the frictional engagement between surfaces $22_1$ and $328_2$ (including the frictional lining 348 thereof) to the intermediate clutch component 325, then serially to the damping assembly 316 and the output hub 40. Thereby, the lockup portion 328 and the casing 12 together create a lockup clutch that bypasses the hydrodynamic fluid coupling of the torque converter 14 and mechanically couples the driving and driven shafts.

In the non-lockup position for the fourth embodiment, the turbine-piston 32 is displaced axially towards the impeller 30, axially moving the intermediate clutch component 325 to space the second engagement surface $328_2$ (including the frictional lining 348 thereof) from the first engagement surface $22_1$ so as to no longer non-rotatably frictionally couple to the first engagement surface $22_1$. Thus, torque transferred from the engine to the casing 12 does not bypass the torque converter 14 through the lockup clutch.

Torque received by the intermediate clutch component 325, whether through the lockup clutch or the torque converter 14, is transmitted through the torsional vibration damper 316 to the output hub 40, which is connected to the driven shaft. As the turbine-piston 32 and the intermediate clutch component 325 move axially into lockup position as described above, the drive tabs 356 of the drive portion 329 are axially displaced relative to the driven tabs 368a, 369a. The axial movement between the drive tabs 356 and the driven tabs 368a, 369a allows the disk parts 368, 369, the driven member 362, and the damping members 64 to remain axially fixed on the output hub 40 while the turbine-piston shell 35 and the intermediate clutch component 325 move in the axial direction.

Figure 7:
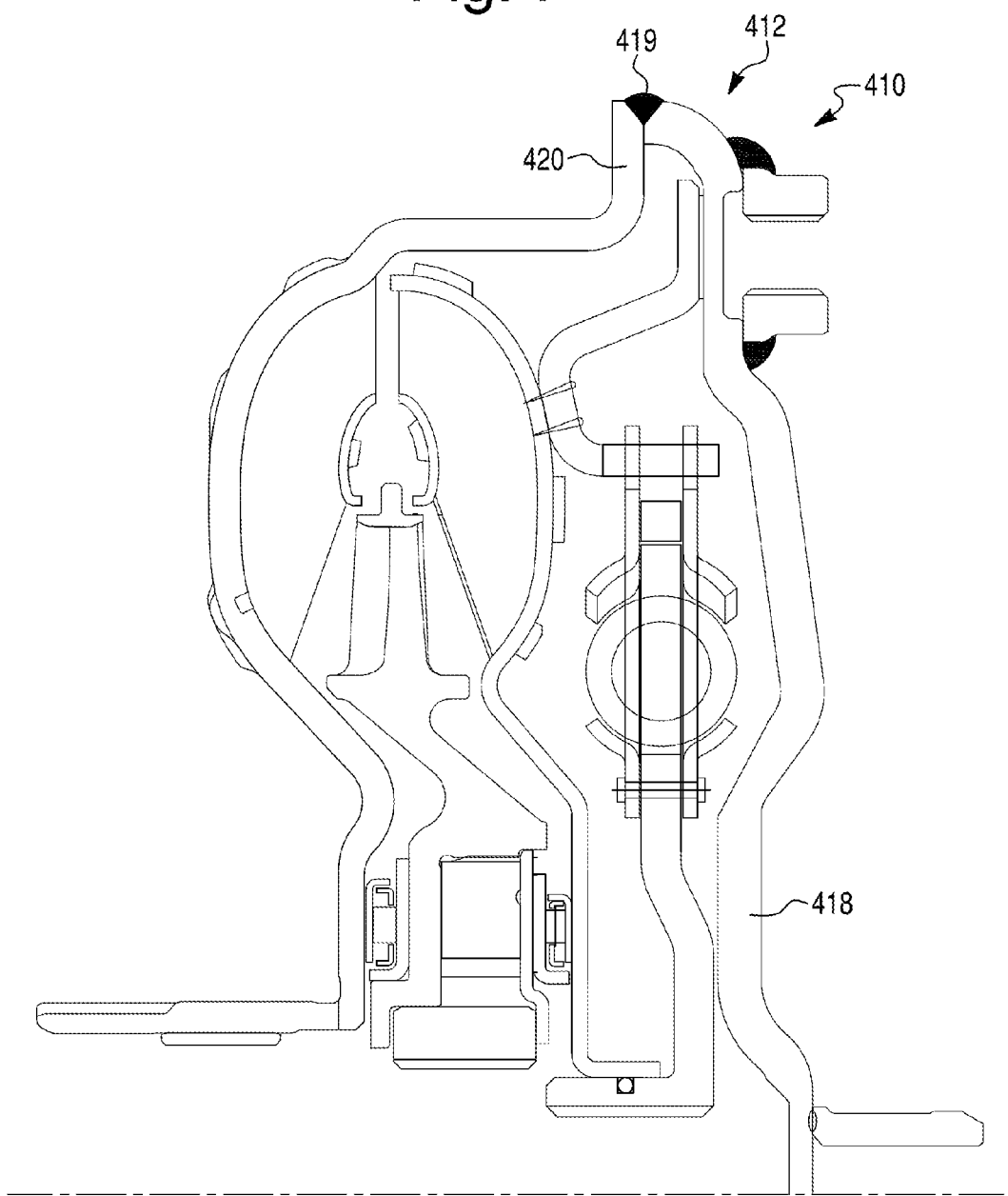
FIG. 7 is a fragmented half-view in axial section of a hydrokinetic torque coupling device equipped with a turbine-piston in accordance with a fifth exemplary embodiment of the present invention.

FIG. 7 is an alternative embodiment of a hydrodynamic torque coupling device 410 similar to the device 310 of FIGS. 5 and 6, but with a casing 412 including a first shell or casing shell 418 and a second shell or impeller shell 420 modified near weld 419 to reduce an internal volume of the casing 412. Fluid volume reduction in turn reduces inertia. The device 410 otherwise is constructed and operates in the manner described above with respect to the device 310 of FIGS. 5 and 6.

In accordance with still another embodiment, the first and second engagement surfaces $24_1$, $28_2$ are angled by less than 90 degrees, such as by 60 to 80 degrees, relative to the rotational axis X. It should be understood that the other embodiments may be likewise modified. In the case of the embodiment of FIGS. 5 and 6, the first and second engagement surfaces $22_1$ and $328_2$ may be angled by less than 90 degrees, such as by 60 to 80 degrees, relative to the rotational axis X.

The features of the above-described embodiments may be practiced with one another and are substitutable in numerous combinations.

An exemplary method for assembling the hydrokinetic torque coupling device 10 according to the embodiment of FIGS. 1 and 2 will now be explained. It should be understood that this exemplary method may be practiced in connection with the other embodiments described herein. This exemplary method is not the exclusive method for assembling the hydrokinetic torque coupling devices described herein. While the methods for assembling the hydrokinetic torque coupling devices 10, 110, 210, 310, and 410 may be practiced by sequentially performing the steps as set forth below, it should be understood that the methods may involve performing the steps in different sequences.

The impeller 30, the turbine-piston 32, the stator 34, and the damper 16 may each be preassembled. The turbine-piston 32 includes, as noted above, the turbine-piston shell 35 and the turbine blades 36 attached to the turbine-piston shell 35. The intermediate clutch component 25 may be, for example, stamped from metal.

The impeller 30, the stator 34, and the turbine-piston 32 subassemblies are assembled together. The intermediate clutch component 25 is secured, such as by continuously welding at the weld 27, to the turbine-piston shell 35 so that the second engagement surface $28_2$ of the lockup portion 28 of the intermediate clutch component 25 faces the first engagement surface $24_1$ of the casing 12. The damper assembly 16 is then added. The cylindrical flange 37 of the turbine-piston 32 is mounted to slidingly engage the output hub 40 (splined with the driven shaft at 42) with the seal 44 therebetween. The drive tabs 56 are engaged with the damper assembly 16 as described above. Then, the first casing shell 18 is non-moveably and sealingly secured, such as by welding at 19, to the second casing shell 20, as best shown in FIG. 1. The other embodiments may be similarly assembled.

Figure 8:
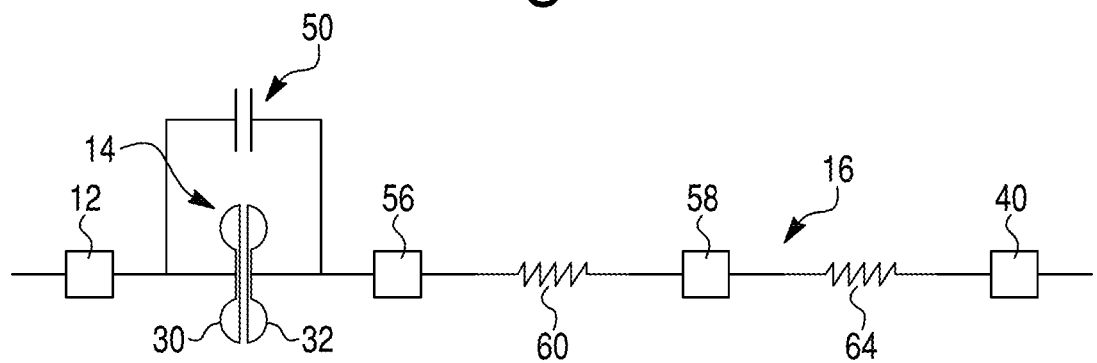
FIG. 8 is a simplified diagram of a hydrodynamic torque coupling device including a turbine-piston with dual or double damper assemblies.

The torque converters and hydrodynamic torque coupling devices described herein may incorporate different damper assemblies. For example, FIG. 8 shows a hydrodynamic torque coupling device including the impeller 30 and the turbine-piston 32 for establishing the hydrodynamic transmission mode and the lockup clutch 50 for lockup mode transmission. The impeller 30/turbine-piston 32 combination and the lockup clutch 50 are arranged parallel to one another and serially between the casing 12 and the turbine-piston shell 35. The elastic damping members 60 and 64 of the damper assembly 16 and the output hub 40 are arranged serially downstream of the turbine-piston shell 35 in FIG. 8. The diagram of FIG. 8 generally corresponds to the arrangement of the embodiments shown in FIG. 1.

Figure 9:
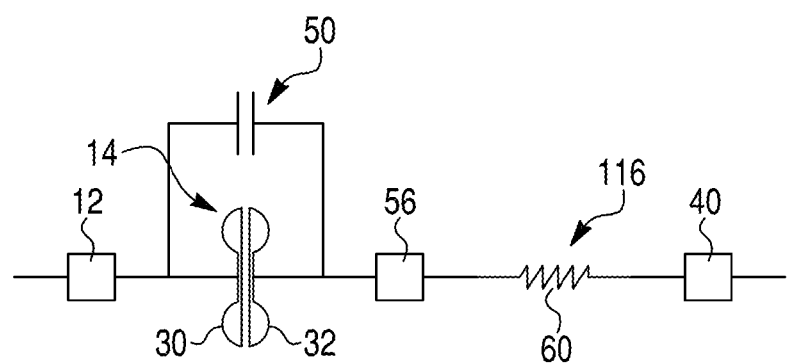
FIG. 9 is a simplified diagram of another hydrodynamic torque coupling device including a turbine-piston with a single damper assembly.

FIG. 9 shows the alternative damper assembly 116 similar to that of FIGS. 3, 4, 5, and 7, in which the damper assembly 116 is modified to include only one set of circumferentially extending elastic damping members 60 (or 64).

Figure 10:
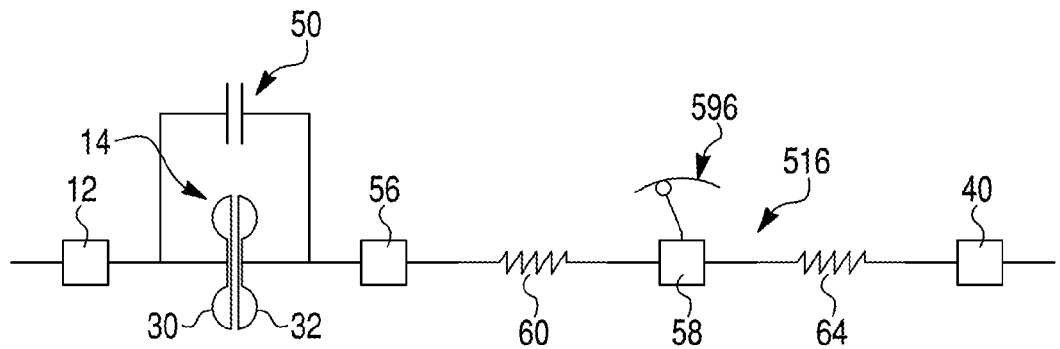
FIG. 10 is a simplified diagram of still another hydrodynamic torque coupling device including a turbine-piston with dual or double damper assemblies and a pendulum vibration absorber.

A damper assembly 516 shown in FIG. 10 is similar to that of FIG. 8, but further includes a centrifugal pendulum oscillator 596 coupled to the intermediate member 58. Centrifugal pendulum oscillators (or pendulum vibration absorbers) are well known in the art and described in, for example, U.S. patent application Ser. No. 14/305,128 filed Jun. 16, 2014, GB598811 to Stone, U.S. Pat. No. 6,026,940 to Sudau, and EP1744074 to Grahl. The centrifugal pendulum oscillator 596 may be coupled to the circumference of the intermediate member 58 and may be arranged on both sides of the intermediate member 58.

Figure 11:
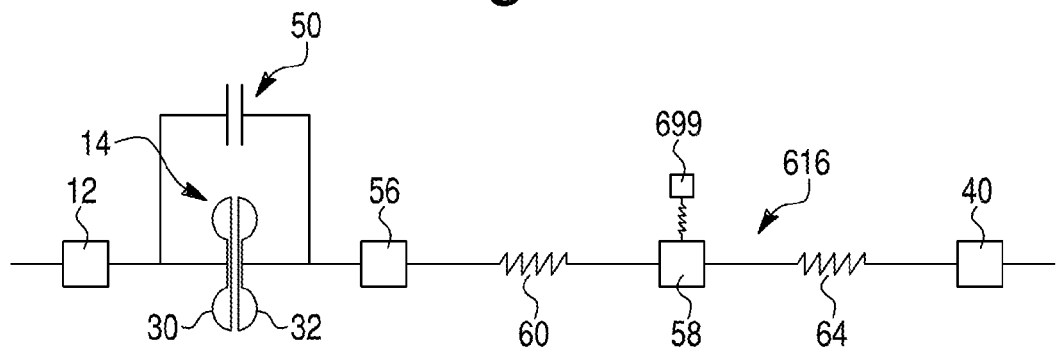
FIG. 11 is a simplified diagram of a further hydrodynamic torque coupling device including a turbine-piston with dual or double damper assemblies and a vibration absorbing spring-mass system.

A damper assembly 616 shown in FIG. 11 is similar to that of FIG. 8, but further includes a spring mass system 699 coupled to the intermediate member 58. Spring-mass systems are well known in the art and described in, for example, WO 2004/018897 to Haller. The spring-mass system 699 may be coupled to the circumference of the intermediate member 58. The spring of the spring-mass system 699 may be a coil spring, such as a steel spring. The damper may be any linear or non-linear damper, including for example a viscous damper. The spring and mass may be embodied as two components or one integral component. The spring-mass system may have a linear or non-linear constant or variable stiffness, and a constant or variable mass.

The features of the above-described embodiments are substitutable in numerous combinations.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device for coupling a driving shaft and a driven shaft together, comprising:
    an impeller rotatable about a rotational axis and comprising an impeller shell;
    a casing shell rotatable about the rotational axis and connected to the impeller shell to establish a casing of the hydrokinetic torque coupling device, the casing having a first engagement surface;
    a turbine-piston coaxially aligned with and hydrodynamically drivable by the impeller, the turbine-piston comprising an axially movable turbine-piston shell;
    an annular intermediate clutch component affixed to the turbine-piston shell and comprising a lockup portion and a drive portion, the lockup portion of the intermediate clutch component having a second engagement surface that is movable axially toward and away from the first engagement surface of the casing to position the hydrokinetic torque coupling device into and out of a lockup mode in which the annular intermediate clutch component with the turbine-piston shell affixed thereto is mechanically locked with so as to be non-rotatable relative to the casing;
    an output hub; and
    a damper assembly interconnecting the annular intermediate clutch component and the output hub, the drive portion of the intermediate clutch component engaging the damper assembly and being axially movable relative to the damper assembly,
    wherein the casing shell forms the first engagement surface of the casing.

2. The hydrokinetic torque coupling device of claim 1, wherein the first engagement surface or the second engagement surface comprises a frictional lining.

3. The hydrokinetic torque coupling device of claim 1, wherein the drive portion of the intermediate clutch component is axially movable.

4. The hydrokinetic torque coupling device of claim 1, wherein the lockup portion of the intermediate clutch component is radially outside of turbine blades of the turbine-piston.

5. The hydrokinetic torque coupling device of claim 1, wherein the first and second engagement surfaces extend radially at an angle of about 90 degrees relative to the rotational axis.

6. The hydrokinetic torque coupling device of claim 1, wherein the lockup portion and the drive portion are integral with one another as a single piece.

7. The hydrokinetic torque coupling device of claim 1, wherein the turbine-piston shell partitions an interior volume of the casing into a torus chamber and a damper chamber, the torus chamber containing impeller blades of the impeller and turbine blades of the turbine-piston, the damper chamber containing the intermediate clutch component.

8. The hydrokinetic torque coupling device of claim 1, wherein the turbine-piston shell and the intermediate clutch component are axially movable towards an input side of the hydrokinetic torque coupling device in order to frictionally couple the first and second engagement surfaces and position the hydrokinetic torque coupling device in the lockup mode, and wherein the turbine-piston shell and the intermediate clutch component are axially movable towards an output side of the hydrokinetic torque coupling device so that the first and second engagement surfaces are not frictionally coupled and the hydrokinetic torque coupling device is not in the lockup mode.

9. The hydrokinetic torque coupling device of claim 1, wherein the damper assembly comprises:
an input part non-rotatably connected to the drive portion of the intermediate clutch component;
an output part non-rotatably connected to the output hub; and
circumferential torsional vibration dampers rotatably interconnecting the input part to the output part.

10. The hydrokinetic torque coupling device of claim 1, wherein the damper assembly comprises first and second dampers serially arranged between the drive portion and the output hub.

11. The hydrokinetic torque coupling device of claim 1, wherein the drive portion forms an input part of the damper assembly, and wherein the damper assembly further comprises an output part non-rotatably connected to the output hub and circumferential torsional vibration dampers rotatably interconnecting the drive portion and the output part.

12. The hydrokinetic torque coupling device of claim 1, wherein the damper assembly comprises an intermediate member, a first set of circumferentially extending elastic damping members drivingly coupling the drive portion of the intermediate clutch component to the intermediate member, a driven member connected to and non-rotatable relative to the output hub, a second set of circumferentially extending elastic damping members drivingly coupling the intermediate member to the driven member, and a centrifugal pendulum oscillator mounted to the intermediate member.

13. The hydrokinetic torque coupling device of claim 1, wherein the damper assembly comprises an intermediate member, a first set of circumferentially extending elastic damping members drivingly coupling the drive portion of the intermediate clutch component to the intermediate member, a driven member connected to and non-rotatable relative to the output hub, a second set of circumferentially extending elastic damping members drivingly coupling the intermediate member to the driven member, and a spring mass system coupled to the intermediate member.

14. A method of assembling a hydrokinetic torque coupling device for coupling a driving shaft and a driven shaft together, comprising:
providing a torque converter rotatable about a rotational axis, the torque converter comprising an impeller comprising an impeller shell, a turbine-piston comprising a turbine-piston shell;
operatively connecting the torque converter with a damper assembly and an intermediate clutch component comprising a lockup portion and a drive portion, whereby the damper assembly interconnects the annular intermediate clutch component and an output hub, the drive portion of the intermediate clutch component engaging the damper assembly and being axially movable relative to the damper assembly; and
operatively connecting the torque converter with a casing shell and the intermediate clutch component to provide a structure comprising (i) the lockup portion affixed to the turbine-piston shell, (ii) a casing comprising the casing shell and the impeller shell and having a first engagement surface, and (iii) the lockup portion having a second engagement surface that is movable axially toward and away from the first engagement surface of the casing to position the hydrokinetic torque coupling device into and out of a lockup mode in which the annular intermediate clutch component with the turbine-piston shell affixed thereto is mechanically locked with so as to be non-rotatable relative to the casing,
wherein the casing shell forms the first engagement surface of the casing.

15. A method of coupling a driving shaft and a driven shaft together with a hydrokinetic torque coupling device comprising an impeller rotatable about a rotational axis and comprising an impeller shell, a casing shell rotatable about the rotational axis and connected to the impeller shell to establish a casing in which the casing shell includes a first engagement surface, a turbine-piston coaxially aligned with and hydrodynamically drivable by the impeller and comprising an axially movable turbine-piston shell, an annular intermediate clutch component affixed to the turbine-piston shell and comprising a lockup portion and a drive portion, an output hub, and a damper assembly configured to interconnect the drive portion of the annular intermediate clutch component and the output hub, wherein the lockup portion of the intermediate clutch component has a second engagement surface that is movable axially toward and away from the first engagement surface of the casing to position the hydrokinetic torque coupling device into and out of a lockup mode in which the annular intermediate clutch component with the turbine-piston shell affixed thereto is mechanically locked with so as to be non-rotatable relative to the casing, the method comprising:
operatively connecting the driving shaft to the impeller shell; and
operatively connecting the driven shaft to the output hub; and
controlling axial movement of the turbine-piston to move the hydrokinetic torque coupling device into and out of the lockup mode.

* * * * *